US009080554B2

(12) United States Patent
Røyseth

(10) Patent No.: US 9,080,554 B2
(45) Date of Patent: Jul. 14, 2015

(54) FLOATING, ANCHORED INSTALLATION FOR ENERGY PRODUCTION

(75) Inventor: Dagfinn Jarl Røyseth, Trondheim (NO)

(73) Assignee: Pelagic Power AS, Vanvikan (NO)

( * ) Notice: Subject to any disclaimer, the term of this patent is extended or adjusted under 35 U.S.C. 154(b) by 822 days.

(21) Appl. No.: 13/259,123

(22) PCT Filed: Mar. 22, 2010

(86) PCT No.: PCT/NO2010/000109
§ 371 (c)(1),
(2), (4) Date: Dec. 12, 2011

(87) PCT Pub. No.: WO2010/110671
PCT Pub. Date: Sep. 30, 2010

(65) Prior Publication Data
US 2012/0093648 A1   Apr. 19, 2012

(30) Foreign Application Priority Data

Mar. 23, 2009 (NO) .................................. 20091207
May 19, 2009 (NO) .................................. 20091933

(51) Int. Cl.
F03D 9/00    (2006.01)
F03D 11/04   (2006.01)
F03B 13/16   (2006.01)
F03B 13/18   (2006.01)

(52) U.S. Cl.
CPC ............. F03D 9/008 (2013.01); F03B 13/187 (2013.01); F03D 11/04 (2013.01); F05B 2240/93 (2013.01); Y02E 10/38 (2013.01); Y02E 10/72 (2013.01)

(58) Field of Classification Search
CPC ........ F03B 13/12; F03B 13/14; F03B 13/141; F03B 13/187; F03B 13/1875; F03B 2240/93; F03D 9/008; F03D 11/04
USPC ................ 415/3.1, 4.1, 7; 416/79, 83, 84, 85; 417/545, 547
See application file for complete search history.

(56) References Cited

U.S. PATENT DOCUMENTS

| 4,076,463 | A | | 2/1978 | Welczer |
| 4,159,427 | A | * | 6/1979 | Wiedemann ..................... 290/55 |
| 4,742,241 | A | * | 5/1988 | Melvin .......................... 290/53 |
| 5,842,838 | A | * | 12/1998 | Berg ............................. 417/331 |
| 6,392,314 | B1 | * | 5/2002 | Dick .............................. 290/53 |
| 6,766,643 | B2 | | 7/2004 | Christensen |
| 7,352,078 | B2 | | 4/2008 | Gehring |

(Continued)

FOREIGN PATENT DOCUMENTS

DE   10102023 A1   7/2002
EP    0761964 A1   3/1997

(Continued)

OTHER PUBLICATIONS

International search report and written opinion for application No. PCT/NO2010/000109 dated Jun. 17, 2010.

(Continued)

Primary Examiner — Edward Look
Assistant Examiner — Jason Davis
(74) Attorney, Agent, or Firm — Patterson & Sheridan, LLP

(57) ABSTRACT

A floating, anchored installation for energy production where the installation comprises at least one windmill, and where the installation is provided with at least one float driven pump.

16 Claims, 5 Drawing Sheets

(56) References Cited

U.S. PATENT DOCUMENTS

| | | | |
|---|---|---|---|
| 7,594,780 B2* | 9/2009 | Bull | 405/195.1 |
| 8,373,292 B2* | 2/2013 | Moritz | 290/44 |
| 8,668,452 B2* | 3/2014 | Henriksen | 416/85 |
| 2008/0018115 A1* | 1/2008 | Orlov | 290/54 |
| 2009/0126616 A1* | 5/2009 | Srinivasan | 114/264 |
| 2009/0196748 A1* | 8/2009 | Salter | 416/120 |

FOREIGN PATENT DOCUMENTS

| | | |
|---|---|---|
| EP | 1366290 A1 | 12/2003 |
| JP | 61226572 A | 10/1986 |
| NO | 32781 B1 | 5/2009 |

OTHER PUBLICATIONS

"Vinn vind" Gemini NR 2 JUNI 2008.

\* cited by examiner

FLOATING, ANCHORED INSTALLATION FOR ENERGY PRODUCTION

This invention relates to a floating, anchored installation for energy production. More particularly it concerns a floating, anchored installation for energy production where the installation comprises at least one windmill.

It is known to dispose windmills on floating, anchored installations offshore. The installations are often designed to be able to hold the windmill supporting structure still, as displacements due to such as installation pitching, rolling or heave motions may impart considerable additional forces to the windmill structure.

A design of the installation accordingly involves, particularly when we are talking about windmills mounted on the same installation, that the installation becomes relatively large, heavy and costly. Available energy production in relation to the building cost becomes relatively modest.

DE 3803570 deals with a floating installation for production of energy from wave power working according to the wedge channel principle, and is provided with windmills.

The object of the invention is to remedy or reduce at least one of the disadvantages of the prior art.

The object is achieved in accordance with the invention by the features stated in the below description and in the subsequent claims.

There is provided a floating, anchored installation for energy production where the installation comprises at least one windmill, and which is characterised in that the installation is provided with at least one float driven power engine.

An installation designed to be able to carry a windmill has normally also sufficient buoyancy and area to be able to accommodate a number of float driven power engines, typically in the form of pumps. Such a design makes a substantial increase in the energy production possible and thereby also improved capital benefit.

The installation may be of triangular basic outline and comprise two windmills in pairs. By disposing a buoyancy element in each of the corner of the triangle, a stable structure is achieved whereon the windmill pair may be disposed at two of the corners. The installation is of course also usable without installed float driven power engines.

The installation may be anchored with limited sway such that the installation may direct itself according to the wind direction to avoid that one of the windmills is exposed to turbulence from the other windmill. By limited sway is meant that the installation is free to be turned a certain angle, for example 90 degrees. Anchoring with limited sway is to be preferred for full sway because the freedom the installation must have for full sway anchoring may apply considerable mass forces to the moorings.

A triangular installation may comprise for example a horizontal connecting structure below water. Such a structure may be suitable for mounting of one or more pumps, which may thereby be submerged.

The piston of a submerged pump according to a preferred embodiment may relatively simply be connected to the pump float by means of a connecting stay where the connecting stay may be guided in a funnel, which may comprise guide rollers.

The pump may be double acting in that the pump piston rod is connected to a counterweight arranged to pull the piston rod downward when the float is displaced down in a wave trough.

The pump piston rod may be provided with an inflow opening for sea water to be able to take in water a distance from the surface where fouling is less of a problem.

The power engine may if desired be constituted by an electric linear generator.

The pair of windmill rotors may be counter-rotating. The forces from the rotors will thereby partly counteract each other, which may reduce such as wind-induced forces on the installation.

Advantageously a horizontal damping plate may be connected to the frame structure relatively deeply in the sea to dampen the heave movement of the frame structure. If damper plates are appropriately designed, for example by being connected to the pontoons, or alternatively to the framing, they will also act as mechanical stiffeners to the frame structure.

To be able to increase the windmill sizes at least one of the windmills may be disposed outside the triangle portion of the installation. The windmill column may for example be connected to a support bridge extending outwards from the corner column. The energy production of the windmills may thereby be increased considerably without an increase in the installation dimensions.

The installation according to the invention renders an improved utilisation of floating devices for wind power production offshore possible than use of prior art. The design as described in the special part of the application exhibits particularly a favourable solution regarding positioning of windmills and pumps.

In the following is described an example of a preferred embodiment illustrated in the accompanying drawings, wherein.

Figure 1:
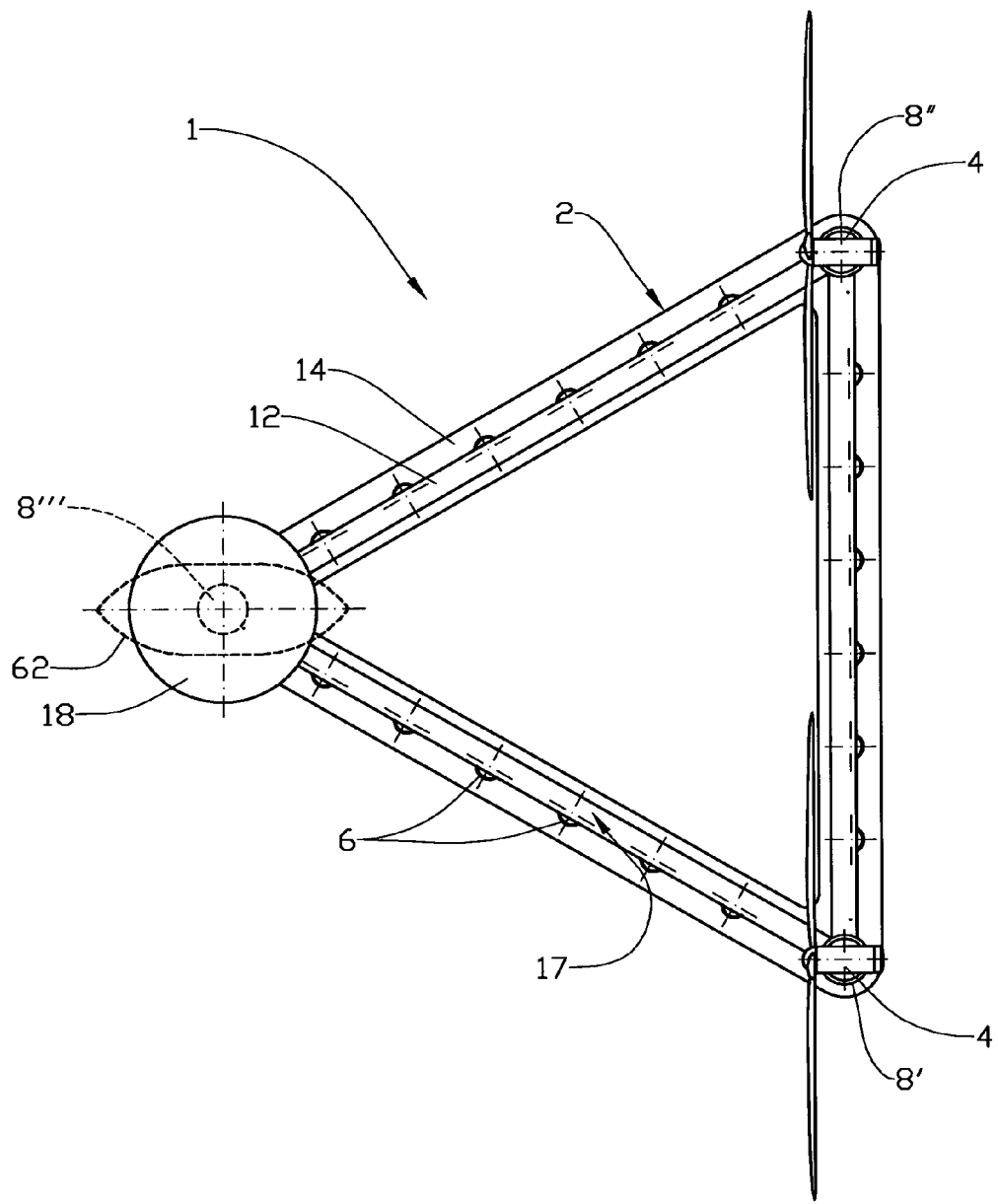
FIG. 1 shows a plan view of an installation according to the invention.

In the drawings the reference numeral 1 indicates an installation according to the invention comprising an in the plan view triangularly shaped frame structure 2, two windmills 4 and a number of float driven pumps 6.

Figure 2:
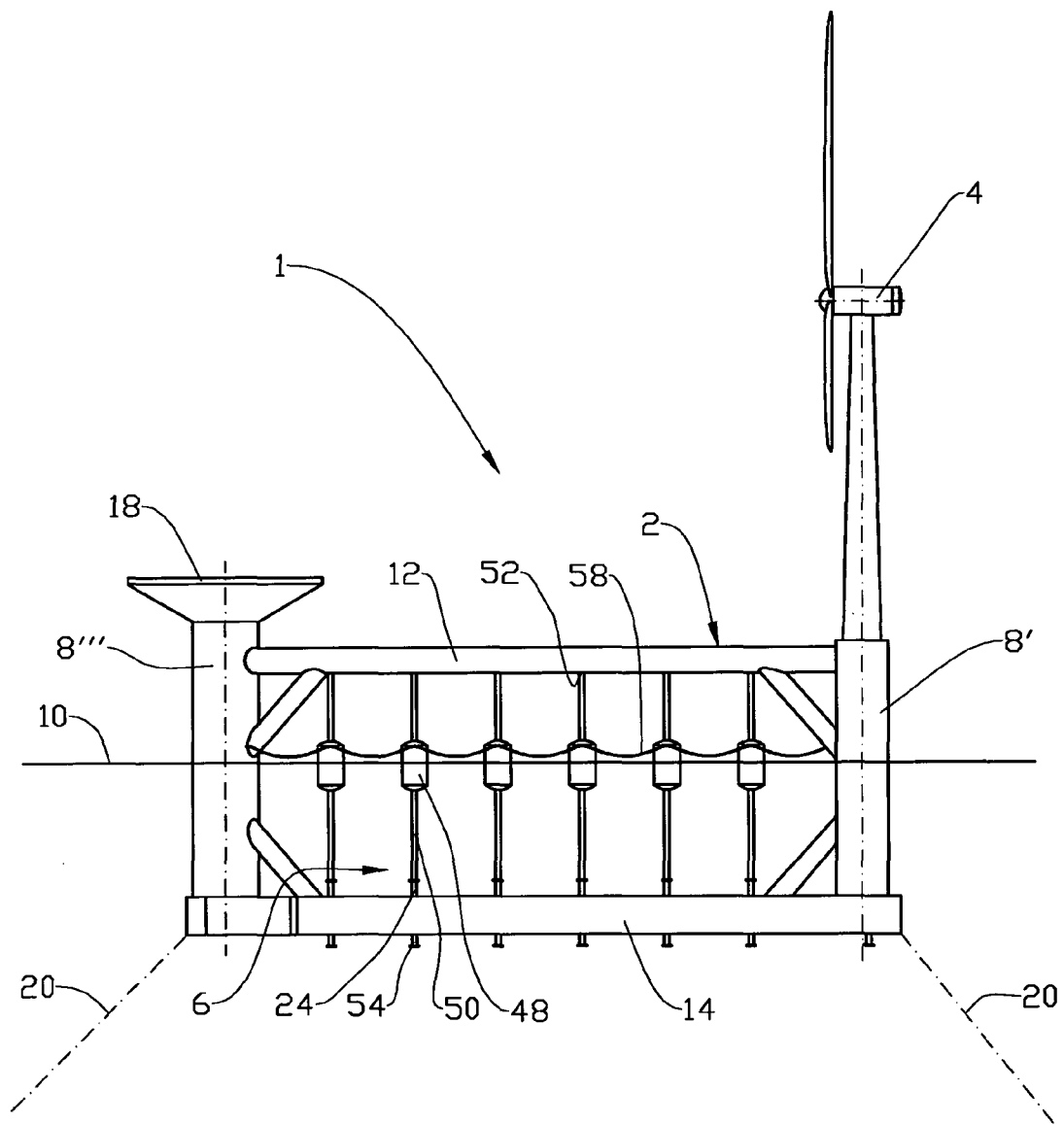
FIG. 2 shows a side view of the installation of FIG. 1.
Figure 3:
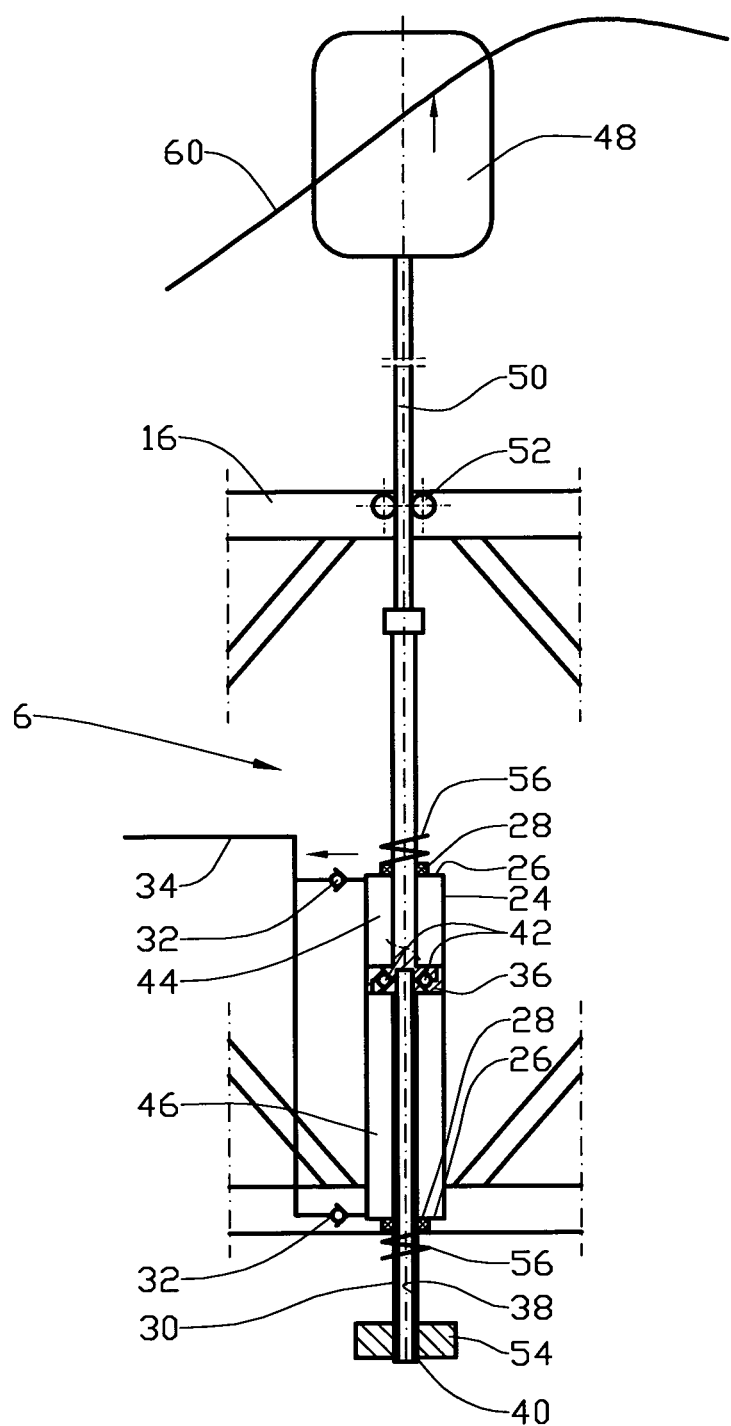
FIG. 3 shows schematically and in a larger scale a pump built into the installation and where the pump piston is being displaced upward.
Figure 4:
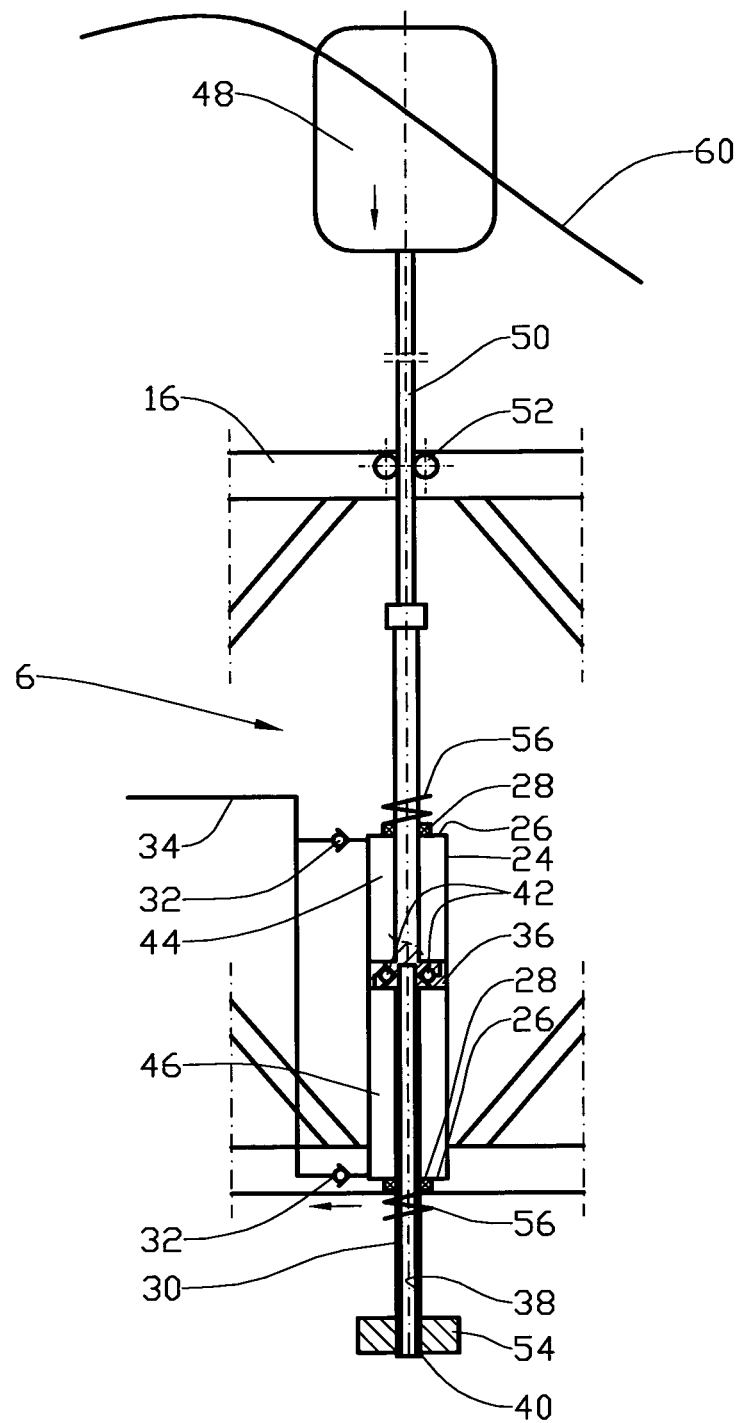
FIG. 4 shows the same as FIG. 3, but where the pump piston is being displaced downward.
Figure 5:
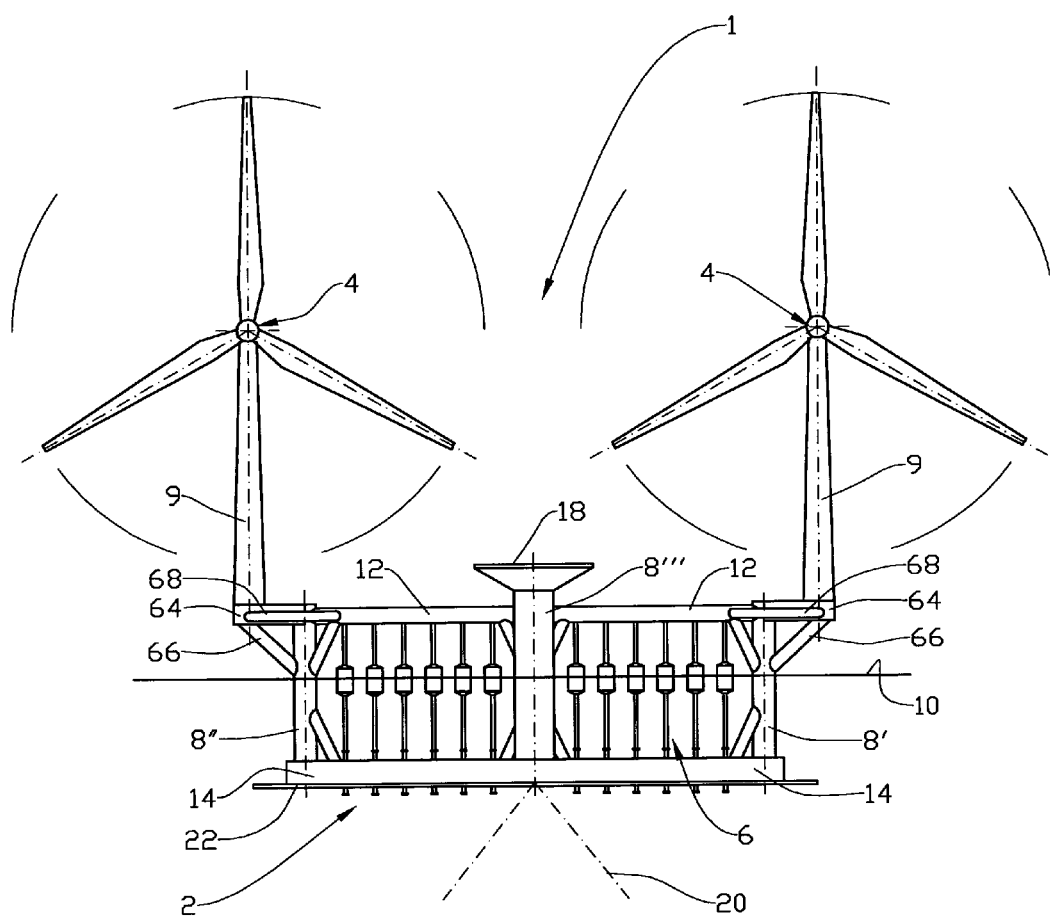
FIG. 5 shows in a somewhat smaller scale the installation of FIG. 1 in an alternative embodiment.

The frame structure 2 is built up of corner columns 8', 8", 8''', which above the water surface 10 is interconnected by means of hollow elements 12 and which extends down to pontoons 14 as shown in FIGS. 1 and 2 or to a framework 16 as shown in FIGS. 3 and 4.

The pontoons 14, alternatively the framework 16, connect the corner columns 8', 8", 8''' below water. The corner columns 8', 8", 8''', the hollow elements 12 and the pontoons 14, alternatively the framework 16, constitute the triangular portion 17 of the installation 1.

The windmills 4, which may be designed having steel or concrete columns 9, are disposed over the first corner column 8' and the second corner column 8", while the third corner column 8''' is provided with a helicopter deck 18.

The installation 1 moorings 20 connected to not shown anchors on the seabed, are designed such that the third corner column 8''' is held against the prevailing wind direction, but where the installation sway is limited by the moorings 20 connected to the first and second corner columns 8', 8".

At the lower portion of the frame structure 2 is disposed horizontal damper plates 22 to reduce the heave motion of the installation 1. The damper plates 22 extending horizontally out from the frame structure 2 may in addition to be disposed at the corners of the frame structure 2 run along the pontoons 14 alternatively along the framework 16, whereby the damper plates 22 also contribute to stiffening of the frame structure 2.

The buoyancy of the corner columns 8', 8", 8''' is adjustable to be able to trim the installation 1.

In each of the pontoons 14, alternatively the framework 16, there are disposed a number of pumps 6. Each pump 6 comprises a pump cylinder 24 which at both end walls 26 is provided with a stuffing box 28 for sealing around a piston rod 30.

The end walls 26 communicate via check valves 32 and a pressurised water pipe 34 with a not shown turbine positioned in the third corner column 8'''.

The piston rod 30 is connected to a pump cylinder 24 sealing piston 36, is designed with an inflow opening 38 for water where the inflow opening 38 runs from the lower portion 40 of the piston rod 30 and into the piston 36 where it via piston valves 42 falls into an upper pump chamber 44, and a lower pump chamber 46 respectively.

The piston rod 30 is further connected to a float 48 by means of a connecting stay 50. In this preferred embodiment a relatively rigid stay running in a sheave guide 52 constitutes the connecting stay 50. The sheave guide 52 may be disposed in the hollow element 12 over the float 48 as indicated in FIG. 2.

The connecting stay 50 may alternatively be flexible such that the float 48 may align itself according to the actual conditions.

The piston rod 30 is provided with a counterweight 54 at its lower portion 40 where there may also be disposed a not shown suction strainer. There are further disposed dampers 56 above and below the pump cylinder 38 to be able to absorb blows if the float 48 should be displaced further than the stroke of the pump 6.

The floats 48 are interconnected by means of flexible damper ropes 58 see FIG. 2. The damper rope 58 is arranged to prevent the floats 48 from getting an unintentionally large horizontal deflection.

During operation the installation 1 will due to its mooring 20 line up against the prevailing wind direction and due to permitted sway also come in line with actual wind direction even if it differs somewhat from the prevailing wind direction. Should the actual wind direction turn more than the moorings 20 allow the installation 1 to turn, then the windmills 4 will in a per se known way align themselves with the wind direction. What might happen then is that one of the windmills 4 is disturbed by turbulence from the windmill 4 in front. During such conditions one of the windmills 4 may be stopped.

When a float 48 is displaced upwards by a wave 60, the connecting stay 50 pulls the piston rod 30 with the piston 36 and the counterweight 54 upward. Water in the upper chamber 44 is displaced by the piston 36 out via the corresponding check valve 32, into the pressurised water pipe 34 and further to the not shown turbine. Simultaneously the lower pump chamber 46 is filled up with water from the sea via the inflow opening 38 and the corresponding one-way piston valve 42.

When the float 48 runs down the wave 60, the counterweight 54 pulls the piston 36 downward, whereby water is displaced from the lower pump chamber 46 via the corresponding check valve 32 to the pressurised water pipe 34, while water is refilled via the inflow opening 38 and the corresponding piston valve 42.

In an alternative embodiment the third corner column 8''', at least at its lower portion, may be given a boat shape 62 as indicated in dotted lines in FIG. 1.

In still another embodiment the windmills 4 are disposed outside the triangular portion 17 of the installation 1 by each windmill 4 column 9 being connected to a support bridge 64 extending from the respective corner column 8', 8".

The invention claimed is:

1. A floating, anchored installation for energy production where the installation comprises at least one windmill where the windmill is disposed outside a triangular portion of the installation, wherein a windmill column is connected to a support bridge extending from a corner column, and wherein the installation is provided with at least one float driven pump.

2. An installation according to claim 1, wherein the installation comprises windmills in pairs.

3. An installation according to claim 2, wherein two windmills in pairs have counter-rotating rotors.

4. An installation according to claim 1, wherein the installation is triangular.

5. An installation according to claim 1, wherein the installation is anchored with limited sway.

6. An installation according to claim 1, wherein the pump is submerged.

7. An installation according to claim 1, wherein a piston of the pump is connected to a float by means of a connecting stay.

8. The installation of claim 7, wherein the connecting stay comprises a rigid stay disposed in a sheave guide.

9. The installation of claim 8, wherein the sheave guide is disposed in a hollow element above the float.

10. The installation of claim 9, wherein the connecting stay is disposed between the hollow element and a pontoon of the installation.

11. The installation of claim 7, wherein the at least one float driven pump further comprises dampers to absorb blows if the float is displaced further than the stroke of the pump.

12. An installation according to claim 1, wherein the pump is double acting.

13. An installation according to claim 1, wherein a piston rod of the pump is provided with an inflow opening.

14. The installation of claim 13, wherein the piston rod comprises a counterweight at a lower portion thereof.

15. An installation according to claim 1, wherein damper plates are disposed horizontally in a lower portion of a frame structure of the installation.

16. The installation of claim 1, wherein the at least one float driven pump includes a pump cylinder having a stuffing box disposed at each end thereof.

* * * * *